Aug. 25, 1959
W. MARCUS
2,900,666
APPARATUS FOR MOLDING A HOLLOW CONTAINER
WITH AN INTEGRAL HANDLE
Filed March 19, 1957
2 Sheets-Sheet 1

INVENTOR.
WILLIAM MARCUS
BY
Hyde, Meyer, Baldwin & Doran
ATTORNEYS

Aug. 25, 1959  
W. MARCUS  
2,900,666  
APPARATUS FOR MOLDING A HOLLOW CONTAINER  
WITH AN INTEGRAL HANDLE  
Filed March 19, 1957  
2 Sheets-Sheet 2

INVENTOR.
WILLIAM MARCUS
BY
Hyde, Meyer, Baldwin & Doran
ATTORNEYS

United States Patent Office 2,900,666
Patented Aug. 25, 1959

2,900,666

APPARATUS FOR MOLDING A HOLLOW CONTAINER WITH AN INTEGRAL HANDLE

William Marcus, Cleveland, Ohio

Application March 19, 1957, Serial No. 647,081

1 Claim. (Cl. 18—42)

This invention relates to improvements in apparatus for molding a hollow container with an attached handle.

An object of this invention is to provide a novel and improved means for forming a handle on a hollow container through the facility of novel die means whereby the container and an integrally connected handle are formed in a single molding operation.

A further object of the present invention is to provide novel die means for producing a hollow article having an integrally connected handle, said die means comprising a container-forming male core adapted to be disposed within a container mold cavity, said core having means attached thereto forming a mold cavity female die member for said integrally connected handle. Said die means also comprises a container-mold-cavity-forming female die member having attached male core means for forming said integrally connected handle. Said die means forms a spacing substantially equal to the wall thickness of the article to be cast to produce a continuous layer of plasticizable synthetic resin, or other suitable casting material, between said cores and mold cavities, whereby said cores may be quickly and easily removed from said mold cavities, and said container and its integrally formed handle may be easily removed as a single unit.

Another object of the present invention is to provide novel die means characterized by their structural simplicity, the ease of assembly of their parts, their strong and sturdy nature and their low manufacturing cost. Other features of this invention reside in the arrangement and design of the parts for carrying out their appropriate functions.

Other objects and advantages of this invention will be apparent from the accompanying drawings and the following description. The essential features will be set forth in the appended claim.

Before describing in detail the herein disclosed embodiments of the invention, it is to be understood that the present invention is not limited to the structural details or the particular arrangement of parts here shown, as devices embodying the present invention may take other forms. It also is to be understood that the phraseology and terminology herein used are for purposes of description and not of limitation, as the scope of the present invention is denoted by the appended claim.

Figure 1:
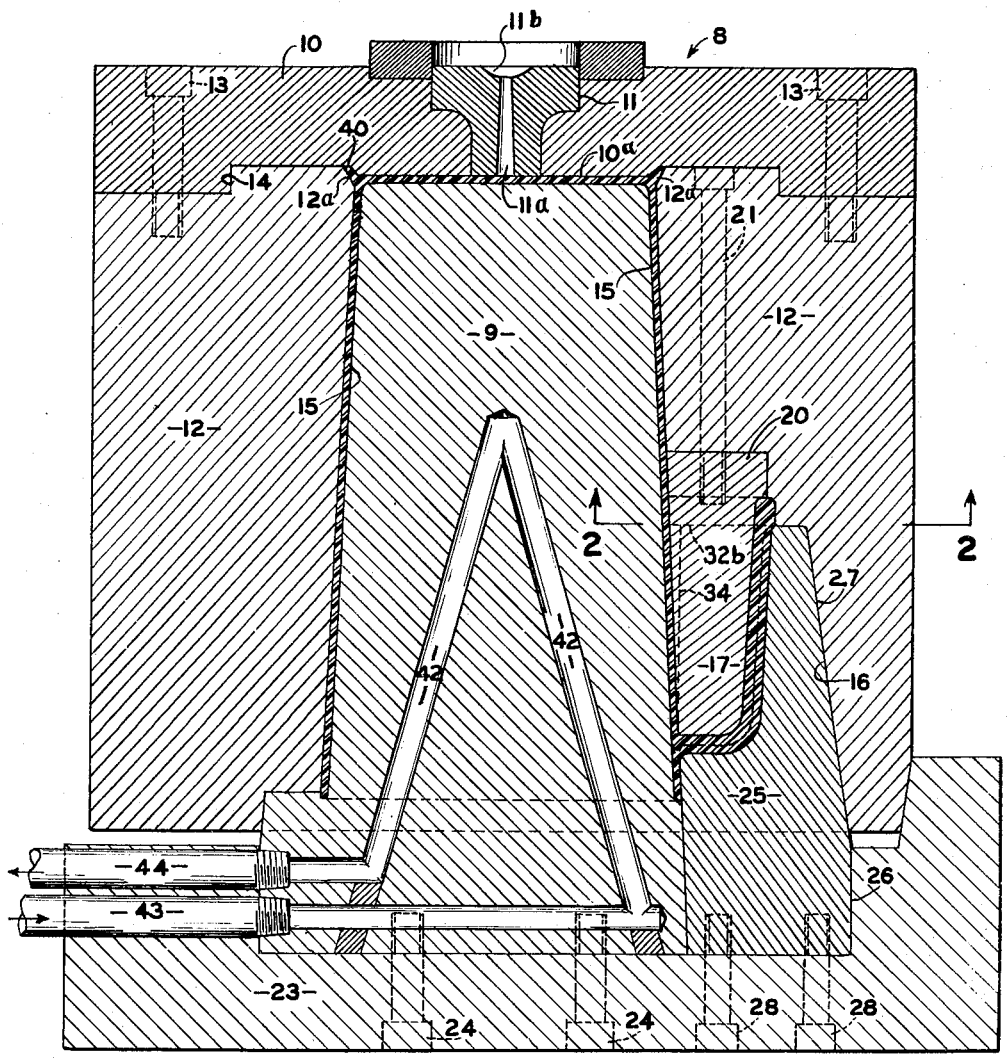
Fig. 1 is a vertical transverse sectional view of the dies, taken along a diameter passing through the handle, and showing the dies in a closed position.
Figure 2:
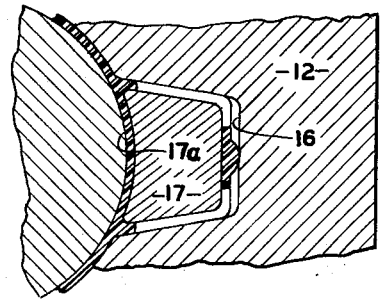
Fig. 2 is a fragmental sectional view taken along the plane of line 2—2 of Fig. 1 showing the die means forming the connection of the lower portion of the handle with the side wall of the hollow container.

Refer now to Fig. 1, wherein I have shown the novel die means utilized in carrying out one embodiment of the present invention. In general, the die means include a female die member 8 having parts 10 and 12 which form the container female die cavity and a container male die member 9 which forms the container die core. The female die member comprises a base 10 which forms a backing plate provided with a central aperture containing a sprue ring 11 which in turn has an injection sprue opening 11a provided therein. It will be understood that the base plate 10 is normally connected with a suitable injection molding machine not herein shown. Those familiar with this art will understand that the molding machine is provided with a convex nozzle which tightly fits in the concave opening 11b contained in the sprue ring 11. A female die cylinder 12 is rigidly secured to the base plate 10 by means of cap screws 13. The female die cylinder 12 is provided with an offset shoulder portion 14 which is received in a complementary portion provided in the base member 10 for the purpose of quickly and precisely positioning said members together. The female die cylinder 12 is provided with a frusto-conical bore 15 which, with the central portion of plate 10 forms the container female die cavity of the molding apparatus. The female die cylinder 12 is formed with a recess 16 which extends outwardly from the side wall of the bore 15, as seen in Figs. 1 and 2, and upwardly from the free or open end of the female die cylinder, as clearly shown in Figs. 1 and 3.

Figure 4:
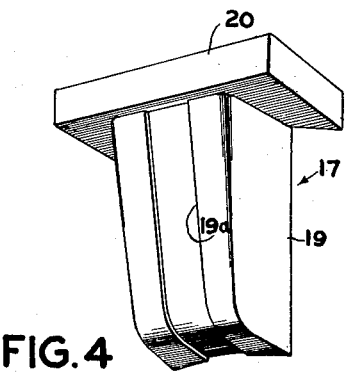
Fig. 4 is an enlarged perspective view of the handle-forming male core member which is attached to the container-forming female mold cavity portion of the die.

A handle-forming male core member 17, as seen in Fig. 4, is rigidly connected to said container-forming female die member 8 and is contained in the recess 16 of said member. The handle forming core member 17 has a radially inner arcuate contour 17a which complements bore 15 of the female die cylinder 12 so as to form a continuation of said bore surface in the zone of recess 16, as seen in Fig. 2. The handle forming core member 17 has a somewhat elongated wedge-shaped portion 19 and a base portion 20 which is connected to the female die member 8 by means of elongated cap screws 21, as seen in Fig. 1.

Figure 6:
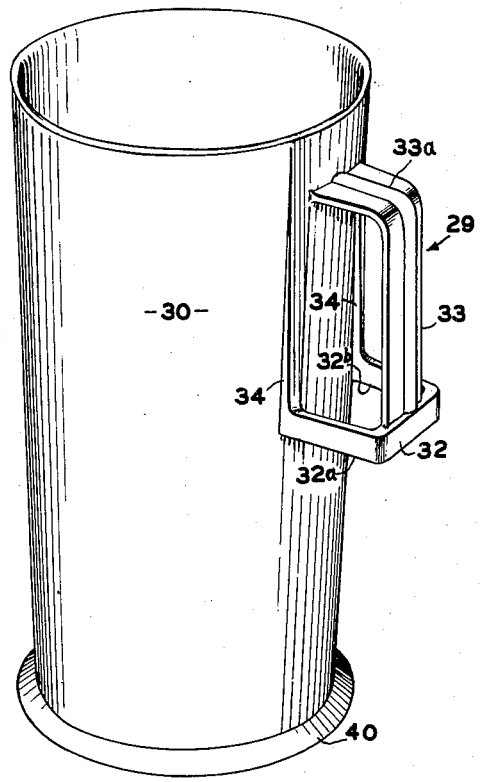
Fig. 6 is a perspective view of a container and associated handle produced in my novel dies.
Figure 5:
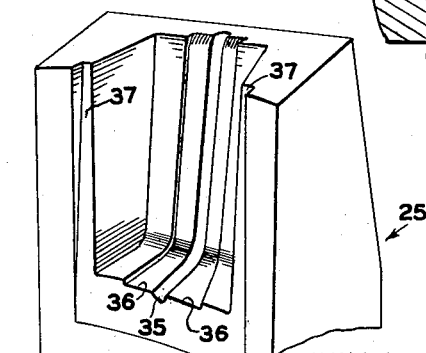
Fig. 5 is an enlarged perspective view of the die block member which forms the female mold cavity for forming the integrally connected handle.

The container-forming male die member 9 is of frusto-conical shape and is adapted to lie within the female die cavity which has a complementary frusto-conical shape of slightly greater cross section providing the thickness of the container wall between them. The container-forming male die member is secured to and includes a die base plate 23, attached by means of cap screws 24. A steel block member 25, as seen in Fig. 5, having a base portion 26 and an upstanding wedge-shaped portion 27, as seen in Fig. 1, provides a handle-forming female die cavity member and is rigidly secured to the die plate 23 by means of cap screws 28. A recess is provided in the block 25 and provides a handle-forming female die cavity which is adapted to cooperate with the handle-forming male core member 17 to form the handle 29 of the container 30, as seen in Fig. 6. As seen in Fig. 2, the recess in block 25 is somewhat larger in cross-sectional dimensions than the handle-forming core member 17 at certain places so that a molding space is provided therebetween to form the handle portions 32, 32a, 32b, 33, 33a and 34 of Fig. 6. At all other points the outer walls of member 17 engage the inner walls of member 25. The lower end of the portion 19 of handle-forming core member 17 terminates short of the base portion 36 of member 25 so that a continuous flow of material may connect the side wall of container 30 with the handle 29.

Figure 3:
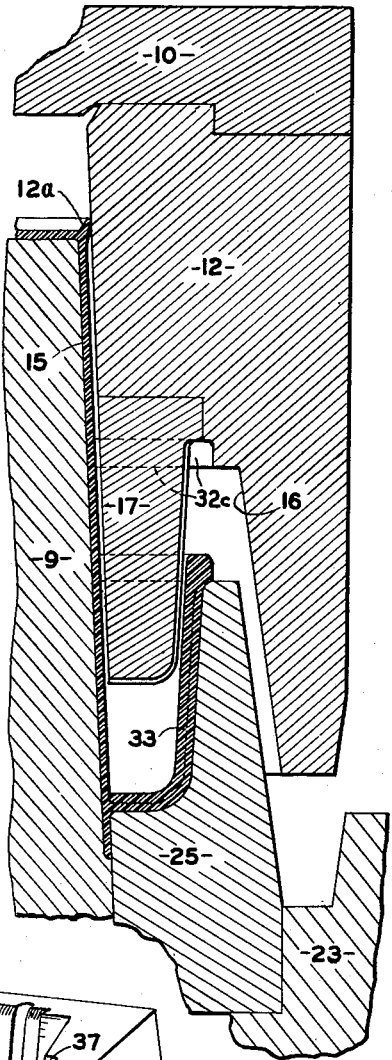
Fig. 3 is a fragmental sectional view showing, in an open position that portion of the die of Fig. 1 which forms the integrally connected handle.

In the present construction, the lower portion 32 of the handle, or that portion which connects the upright portion 33 which is to be grasped by the hand, is formed of a U-shape which has spaced leg members or handle connectors 32a and 32b which flow continuously into a pair of vertically extending triangular ribs 34 formed along the surface of the side wall of the container 30. The leg members 32a and 32b are formed by channel shaped recesses in block 12 which, with core member 17, form leg openings as at 32c in Fig. 3. The handle portion 33 is seen to engage the U-shaped portion 32 at substantially the center of its base. The upper end of the handle portion 33, and the legs 32a and 32b, are integrally connected to the side wall of the container 30. The upper end of handle portion 33 forms a single handle connector to the container wall. The handle portion 33 is formed with an upstanding rib 33a for added rigidity. The rib 33a and handle portion 33 are formed by the complementary grooves 35 and 36 respectively contained in the side wall of the recess provided in member 25. The vertically extending ribs 34 are seen to be somewhat triangular in shape, or in other words are somewhat thicker at their lower portion than at their top portion so as to provide an outermost surface which is substantially vertical (or parallel to the central axis of the container) in spite of the frusto-conical surface of the container itself. The triangular shaped ribs 34 are formed by complementary grooves 37 provided in the member 25, as seen in Fig. 5. In Figs. 1, 2 and 3, the handle-forming core member 17 is so constructed as to cooperate with the recess of the handle forming recess of block member 25 to form the handle 29 integral with the side wall of container 30, in a single molding operation. As heretofore recited, this is accomplished by providing spaces between the side walls of the recess of member 25 and the outer peripheral surface of the handle forming die core member 17. The space between said members is constructed so as to communicate with the molding space provided between the female die member 8 and male die member 9.

It will be noted that the triangular shaped ribs 34 connected between the sloping wall of the container and the handle 29 permit separation of the container-forming male and female die members and their associated handle-forming cavity and core members, along vertical lines. Suitable means not herein shown would be provided in a known type of injection molding machine for traveling the mold sections away from each other in a separating movement.

When the two complementary mold sections 8 and 9 are in an assembled position, as seen in Fig. 1, the female die member and male die member define between them a molding space having peripheral walls which define the side walls of the container 30, to be formed therein and shown in perspective in Fig. 6. It will be noted that when the mold sections are in their assembled positions they form a substantially leak-proof contact between them. In the preferred embodiment herein shown the base member 10 is provided with an upstanding portion 10a which projects into the bore or die cavity 15 to form the bottom of container 29. A small annular groove is provided between the side edges of upstanding portion 10a and the angularly cut end surfaces 12a of the female die cylinder 12 to provide an annular outwardly flaring flange 40 at the bottom of container 29. The flange 40 is integrally connected with a plurality of circumferentially spaced radially extending ribs (not herein shown) which add rigidity to the rim 40 and reinforce it to maintain the position as shown in Figs. 1 and 6. The flange 40 is undercut and therefore the molded container is stripped from the dies at a rather hot temperature, so that the flange may collapse as it is drawn out of the mold in the position shown in Fig. 3. Due to its resiliency the flange will return to its original shape as it cools, as seen in Figs. 1 and 6. To this end, a temperature control chamber 42 which receives temperature controlling fluid, such as water, is provided in the male die member 9 and terminates some distance from the outer end of member 9 which forms the bottom of the container 29. In this manner the outwardly extending flange portions 40 are not substantially cooled and remain at a rather hot temperature and somewhat resilient to permit withdrawal of the container, as seen in Fig. 3. The temperature controlled chamber 42 is supplied by inlet and outlet passages 43 and 44 respectively as seen in Fig. 1, which communicate with a suitable reservoir (not herein shown) or other circulating system for supplying such fluid.

In the preferred embodiment therein shown the male die member 9 extends into the female die member 8 in alignment therewith, so that the injected plastic material entering through the injection opening 11a will normally impinge against the end of member 9 and will then flow around and fill the entire molding space forming both the container 30 and its integrally connected handle 29 in a single continuous molding operation.

The operation of the present device should now be apparent from the above description. The mold sections are first moved into the position, as seen in Fig. 1, so that the male die member 9 is disposed within the female die member 8 in a proper container forming position, and handle-forming die core member 17 is properly disposed within the handle forming die cavity member 25 associated with the male die member 9. When the mold sections have been tightly closed, a metered charge of heated synthetic resin is injected into the molding space from an injection nozzle via the injection sprue 11a. The plasticized synthetic resin material collides with the end of member 9 and is distributed rapidly in a radially outwardly direction across the bottom of the container and then along the side walls of the container, while simultaneously filling in those molding spaces which form the handle as an integral part of the container 29. After the mold has been in a closed position for a period long enough to permit the material to become set, and while the bottom portion of the container, particularly that portion forming the flange 40 remains at a rather hot temperature, the mold sections are opened, as seen in Fig. 3, by withdrawing the male die member 9 from the female die member 8 in one continuous operation, without the necessity of first disassembling other parts as was previously common practice. At the same time, members 25 and 17 are separated as shown in Fig. 3. The temperature control cavity chamber 42 at this point has functioned to cool the major portion of the plasticizable resin material forming the container to a point wherein it has solidified while permitting the flange portion 40 to remain at rather hot temperatures so that it may be deformed to pass through the reduced circumference of the cavity bore 15 during the withdrawing operation as seen in Fig. 3. The container 29 may then be easily ejected or removed from the male die member 9 and its associated handle forming die cavity member 25.

In view of the foregoing description, taken in conjunction with the accompanying drawings, it is believed that a clear understanding of the construction, operation and advantages of the device will be quite apparent to those skilled in this art.

Having thus described my invention and illustrated its use, what I claim is new and desire to secure by Letters Patent is:

Injection molding apparatus for producing a hollow article having an integrally molded handle wherein said handle includes at its one end a single handle connector connected to the wall of said container, and at its other end two spaced handle connectors connected to the wall of said container, said apparatus comprising a female container-forming die member defining a core-receiving cavity, a male container-forming die member having a projecting core provided thereon, said core of said male die member adapted to be disposed within said core receiving cavity to delimit the container walls between said die members defining a hollow article molding space, one of said die members having a handle-forming die core member rigidly connected thereto, the other of said die members having a handle-forming die cavity member rigidly connected thereto, said handle-forming die core member adapted to be disposed within said handle-forming die cavity member and adapted to extend between said two spaced handle connectors up to the inner face of said single handle connector and to delimit the inner surface of the handle and the outer surface of the container wall opposite said handle, said handle-forming die members defining between them a handle-forming molding space, and said handle-forming molding space communicating with said molding space defining said hollow article whereby hollow articles having integrally connected handles may be molded in a single molding operation, and said handle-forming die core member may be withdrawn between said two spaced handle connectors after the molding operation is completed.

References Cited in the file of this patent

UNITED STATES PATENTS

| | | |
|---|---|---|
| 1,257,119 | Reynolds | Feb. 19, 1918 |
| 2,039,574 | Wenderoth | May 5, 1936 |
| 2,770,011 | Kelly | Nov. 13, 1956 |
| 2,773,284 | Kelly | Dec. 11, 1956 |

FOREIGN PATENTS

| | | |
|---|---|---|
| 921,678 | Germany | Aug. 16, 1955 |